United States Patent
Luo et al.

(10) Patent No.: US 10,664,624 B2
(45) Date of Patent: May 26, 2020

(54) METHOD AND APPARATUS FOR CONTROLLING VIDEO OUTPUT, AND CONTROL CIRCUIT

(71) Applicant: Huawei Technologies Co., Ltd., Shenzhen (CN)

(72) Inventors: Huamin Luo, Bristol (GB); Chiranjib Chakraborty, Shenzhen (CN); Shangsong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 16/027,771

(22) Filed: Jul. 5, 2018

(65) Prior Publication Data
US 2018/0330128 A1 Nov. 15, 2018

Related U.S. Application Data

(63) Continuation of application No. PCT/CN2016/112149, filed on Dec. 26, 2016.

(30) Foreign Application Priority Data

Jan. 4, 2016 (CN) .......................... 2016 1 0005644

(51) Int. Cl.
*G06F 21/84* (2013.01)
*G06F 21/10* (2013.01)
(Continued)

(52) U.S. Cl.
CPC .............. *G06F 21/84* (2013.01); *G06F 21/10* (2013.01); *H04N 21/2541* (2013.01);
(Continued)

(58) Field of Classification Search
CPC ..... G06F 21/84; G06F 21/10; H04N 21/4627; H04N 21/4363; H04N 21/4367;
(Continued)

(56) References Cited

U.S. PATENT DOCUMENTS

| 2004/0125953 A1* | 7/2004 | Cho ....................... H04N 7/163 380/203 |
| 2005/0225547 A1* | 10/2005 | Choi ........................ G06F 3/14 345/211 |

(Continued)

FOREIGN PATENT DOCUMENTS

| CN | 101304420 A | 11/2008 |
| CN | 101771844 A | 7/2010 |

(Continued)

OTHER PUBLICATIONS

Machine Translation and Abstract of Chinese Publication No. CN105681882, dated Jun. 15, 2016, 16 pages.

(Continued)

*Primary Examiner* — Christopher C Harris
(74) *Attorney, Agent, or Firm* — Conley Rose, P.C.

(57) ABSTRACT

A method and an apparatus for controlling video output, where the method includes detecting in real time, by a security controller, whether an output resolution configured in a video display controller and a high-bandwidth digital content protection (HDCP) encryption status configured in a high-definition multimedia interface (HDMI) satisfy an HDCP requirement of a video, and when the HDCP requirement of the video is not satisfied, sending, by the security controller, an instruction to the video display controller instructing the video display controller to stop outputting the video. Hence, when the HDCP requirement of the video is not satisfied the output video is insecure such that the security controller sends the instruction to the video display controller instructing the video display controller to stop outputting the video. Therefore, security of the video output is ensured.

9 Claims, 3 Drawing Sheets

(51) Int. Cl.
*H04N 21/4367* (2011.01)
*H04N 21/4363* (2011.01)
*H04N 21/4627* (2011.01)
*H04N 21/254* (2011.01)
*H04N 21/4405* (2011.01)

(52) U.S. Cl.
CPC ..... *H04N 21/4363* (2013.01); *H04N 21/4367* (2013.01); *H04N 21/4405* (2013.01); *H04N 21/4627* (2013.01)

(58) Field of Classification Search
CPC ........... H04N 21/4405; H04N 21/2541; H04N 21/4621; H04N 21/443; H04N 21/4424; H04N 21/43635
See application file for complete search history.

(56) References Cited

U.S. PATENT DOCUMENTS

| | | | |
|---|---|---|---|
| 2008/0013725 | A1 | 1/2008 | Kobayashi |
| 2008/0222703 | A1* | 9/2008 | Mantani ................ H04L 9/3271 726/3 |
| 2010/0172630 | A1 | 7/2010 | Chou et al. |
| 2013/0044084 | A1* | 2/2013 | Hendry ............ G11B 20/00463 345/204 |
| 2013/0054978 | A1 | 2/2013 | Yun et al. |
| 2013/0305342 | A1* | 11/2013 | Kottilingal ............. G06F 21/62 726/11 |
| 2014/0095890 | A1 | 4/2014 | Mangalore et al. |
| 2014/0211941 | A1* | 7/2014 | Oh ......................... G06F 21/10 380/201 |
| 2015/0020210 | A1* | 1/2015 | Brown ................... G06F 21/84 726/27 |
| 2015/0229471 | A1 | 8/2015 | Nair et al. |
| 2015/0281186 | A1* | 10/2015 | Smith ................. H04L 63/0428 726/27 |

FOREIGN PATENT DOCUMENTS

| | | |
|---|---|---|
| CN | 103164657 A | 6/2013 |
| CN | 103827886 A | 5/2014 |
| CN | 105681882 A | 6/2016 |
| EP | 2745234 | 6/2014 |
| WO | 2009137247 A2 | 11/2009 |
| WO | 2013026041 A1 | 2/2013 |
| WO | 2015099698 A1 | 7/2015 |

OTHER PUBLICATIONS

Foreign Communication From a Counterpart Application, Chinese Application No. 201610005644.9, Chinese Office Action dated Feb. 26, 2018, 7 pages.
Foreign Communication From a Counterpart Application, Chinese Application No. 201610005644.9, Chinese Search Report dated Feb. 12, 2018, 2 pages.
Foreign Communication From a Counterpart Application, PCT Application No. PCT/CN2016/112149, English Translation of International Search Report dated Mar. 22, 2017, 3 pages.
Foreign Communication From a Counterpart Application, PCT Application No. PCT/CN2016/112149, English Translation of Written Opinion dated Mar. 22, 2017, 6 pages.
"High-bandwidth Digital Content Protection System, Mapping HDCP to HDMI," XP055229610, Digital Content Protection LLC, Feb. 13, 2013, pp. 1-72.
Mohanty, M., et al., "Media Data Protection during Execution on Mobile Platforms—A Review," XP055194665, Jul. 4, 2014, 32 pages.
"End-to-End Network Architectures (E2NA); Mechanisms addressing interoperability of multimedia service and content distribution and consumption with respect to CA/DRM solutions," XP014248221, Technical Report, vol. E2NA, ETSI TR 101 532, No. V1.1.2, Mar. 1, 2015, 36 pages.
Foreign Communication From a Counterpart Application, European Application No. 16883435.6, Extended European Search Report dated Nov. 16, 2018, 12 pages.

* cited by examiner

METHOD AND APPARATUS FOR CONTROLLING VIDEO OUTPUT, AND CONTROL CIRCUIT

CROSS-REFERENCE TO RELATED APPLICATIONS

This application is a continuation of International Patent Application No. PCT/CN2016/112149 filed on Dec. 26, 2016, which claims priority to Chinese Patent Application No. 201610005644.9 filed on Jan. 4, 2016. The disclosures of the aforementioned applications are hereby incorporated by reference in their entireties.

TECHNICAL FIELD

The present disclosure relates to video output, and in particular, to a method and an apparatus for controlling video output, and a control circuit.

BACKGROUND

With evolution of video encoding and decoding technologies and people's constant pursuits of higher-quality visual images, 4000 (4K) ultra-high-definition (UHD) resolution videos have gradually come out and are rapidly popularized. Because costs for producing high-quality videos are high, copy-protection has become the industry consensus and is continuously enhanced. In the UHD age, organizations represented by the MOVIELABS have formulated corresponding security specifications. In the security specifications, it is especially emphasized that an output video is protected using a high-bandwidth digital content protection (HDCP), and security and robustness of a video play execution environment are emphasized.

The GLOBALPLATFORM standard association has defined two execution environments, a trusted execution environment (TEE) and a rich execution environment (REE). The TEE is a relatively simple secure execution environment, and software and hardware resources running in the TEE are secure and trusted. The REE is a rich and open execution environment, and there are many software and hardware resources running in the REE and the REE is open to software. Consequently, the REE lacks security.

Figure 1:
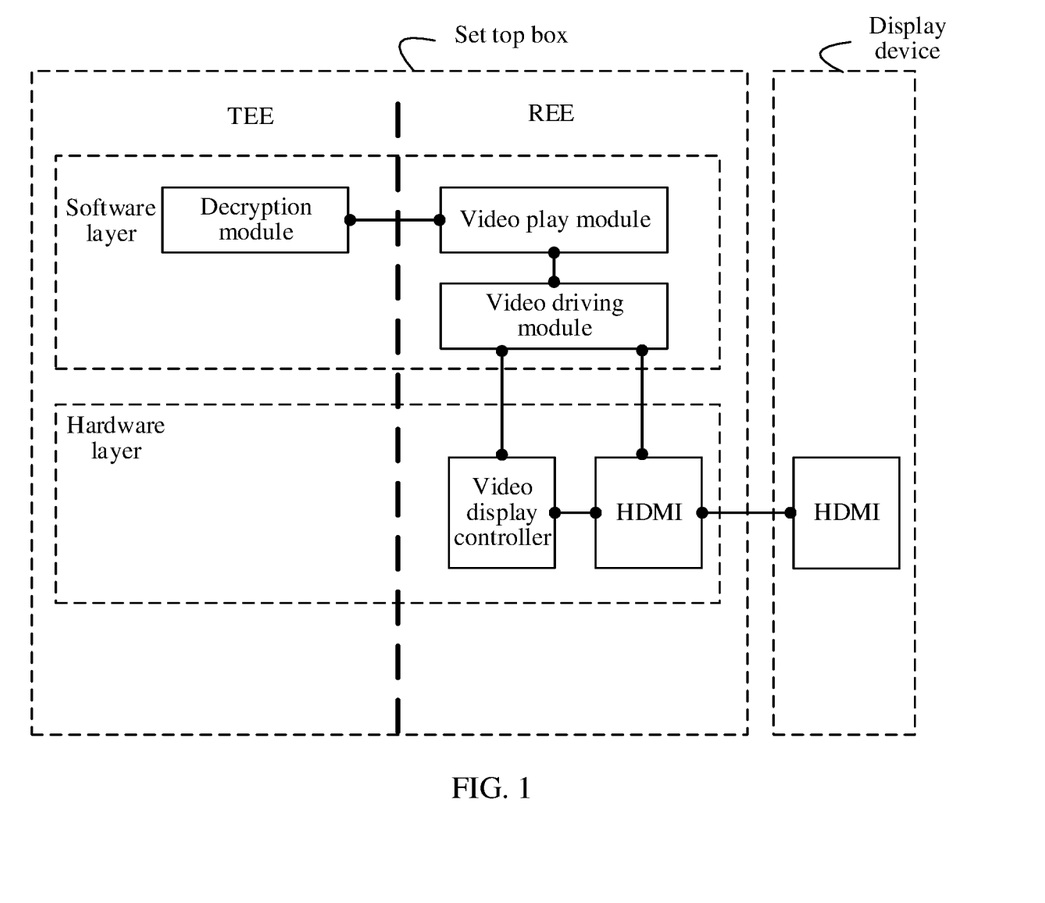
FIG. 1 is an architectural diagram of implementing video output in a system formed by a set top box and a display device.

FIG. 1 is an architectural diagram of implementing video output in a system formed by a set top box and a display device. On a side of the set top box, a decryption module at a software layer is located in a TEE, a video play module and a video driving module at the software layer are located in an REE, and a video display controller and a high-definition multimedia interface (HDMI) at a hardware layer are located in the REE. On a side of the display device, the display device also includes an HDMI.

When the set top box is started or insertion or removal occurs on either one of the HDMIs of the set top box and the display device, the video driving module queries extended display identification data (EDID) information of the display device using the HDMI of the set top box to obtain a resolution supported by the display device, whether the HDCP protocol is supported, and an HDCP protocol version supported when the HDCP protocol is supported.

The video driving module sets an output resolution of the video display controller, and the output resolution configured in the video display controller is used to control a resolution displayed during video output. Further, the video driving module sets an initial output resolution of the video display controller to the resolution supported by the display device.

The video driving module further sets an HDCP encryption status of the HDMI of the set top box. Further, when the display device does not support the HDCP protocol, the video driving module sets the HDCP encryption status of the HDMI of the set top box to HDCP encryption disabled. When the display device supports the HDCP protocol, the video driving module performs HDCP handshake negotiation according to the obtained HDCP protocol version supported by the display device and the HDMI of the display device. When the negotiation succeeds, the HDCP encryption status of the HDMI of the set top box is configured to HDCP protocol version encryption enabled. When the negotiation fails, the HDCP encryption status of the HDMI of the set top box is configured to HDCP encryption disabled.

For example, if HDCP2.2 negotiation succeeds, the HDCP encryption status of the HDMI of the set top box is configured to HDCP2.2 encryption enabled. If HDCP1.4 negotiation succeeds, the HDCP encryption status of the HDMI of the set top box is configured to HDCP1.4 encryption enabled. If HDCP2.2 negotiation and HDCP1.4 negotiation fail, the HDCP encryption status of the HDMI of the set top box is configured to HDCP encryption disabled.

The HDMI includes an HDMI controller, and the HDMI of the set top box is configured using the HDMI controller.

When a user requests to play a secure video, the video play module receives a play request of the user and stores the obtained video and license information of the video into a memory, and then triggers the decryption module in the TEE to decrypt the license information of the video, to obtain an HDCP requirement of the video.

After the decryption module obtains the HDCP requirement of the video, the video driving module sets the output resolution of the video display controller according to the HDCP requirement and the HDCP encryption status configured in the HDMI of the set top box. For example, the HDCP requirement requires to use the HDCP2.2. If the HDCP encryption status configured in the HDMI of the set top box is HDCP2.2 encryption enabled, the video driving module sets the output resolution of the video display controller to 4K UHD supported by the HDCP2.2. If the HDCP encryption status of the HDMI of the set top box is HDCP1.4 encryption enabled, the video driving module sets the output resolution of the video display controller to full high-definition (FHD) supported by the HDCP1.4.

In the other approaches, after the video driving module sets the HDCP encryption status of the HDMI of the set top box and the output resolution of the video display controller, because the video driving module is located in the REE, the video driving module is easily attacked, resulting in tampering with the HDCP encryption status of the HDMI of the set top box or the configuration of the output resolution of the video display controller. Consequently, security of the video that is output from the video display controller cannot be ensured.

SUMMARY

In a method and an apparatus for controlling video output according to embodiments of the present disclosure, security of video output can be ensured.

According to a first aspect, an embodiment of the present disclosure provides a method for controlling video output, including detecting in real time, by a security controller, whether an output resolution configured in a video display controller and an HDCP encryption status configured in an HDMI satisfy an HDCP requirement of a video, where the security controller is located at a hardware layer in a TEE, and sending, by the security controller, an instruction to the video display controller to instruct the video display controller to stop output of the video when the configured output resolution or the configured HDCP encryption status does not satisfy the HDCP requirement of the video.

With reference to the first aspect, in a first implementation of the first aspect, the method further includes performing, by the security controller, no operation when the configured output resolution and the configured HDCP encryption status satisfy the HDCP requirement of the video.

With reference to the first aspect or the first implementation of the first aspect, in a second implementation of the first aspect, the method further includes receiving, by the security controller, a configuration request sent by a decryption module located at a software layer in the TEE, where the configuration request includes the HDCP requirement of the video.

With reference to the first aspect, or the first or the second implementation of the first aspect, in a third implementation of the first aspect, the HDCP requirement includes detecting whether HDCP encryption is used during transmission of the video, and an HDCP protocol version used when the HDCP encryption is used.

With reference to the first aspect, or the first or the second or the third implementation of the first aspect, in a fourth implementation of the first aspect, the HDCP encryption status is HDCP protocol version encryption enabled or HDCP encryption disabled.

According to a second aspect, an embodiment of the present disclosure provides a control circuit, where the control circuit is located in a TEE, and the control circuit includes a detection circuit configured to detect in real time whether an output resolution configured in a video display controller and an HDCP encryption status configured in an HDMI satisfy an HDCP requirement of a video, and a sending circuit configured to send an instruction to the video display controller to instruct the video display controller to stop output of the video when the detection circuit determines that the configured output resolution or the configured HDCP encryption status does not satisfy the HDCP requirement of the video.

With reference to the second aspect, in a first implementation of the second aspect, the control circuit further includes a receiving circuit configured to receive a configuration request sent by a decryption module located at a software layer in the TEE, where the configuration request includes the HDCP requirement of the video.

According to a third aspect, an embodiment of the present disclosure provides an apparatus for controlling video output, where the apparatus includes a software layer and a hardware layer, the software layer includes a video play module and a decryption module, and the hardware layer includes a security controller, a video display controller, and an HDMI, where the video play module is configured to receive a request for playing a video, and trigger the decryption module to decrypt license information of the video, the decryption module is configured to decrypt the license information of the video to obtain an HDCP requirement of the video, and send a configuration request to the security controller, where the configuration request includes the HDCP requirement of the video, the security controller is configured to receive the configuration request sent by the decryption module, detect in real time whether an output resolution configured in the video display controller and an HDCP encryption status configured in the HDMI satisfy the HDCP requirement of the video included in the configuration request, and when the configured output resolution or the configured HDCP encryption status does not satisfy the HDCP requirement of the video, send an instruction to the video display controller, and the video display controller is configured to receive the instruction sent by the security controller, and stop output of the video.

With reference to the third aspect, in a first implementation of the third aspect, the software layer further includes a video driving module, where the video driving module is configured to query EDID information of a peer end device using the HDMI to obtain a resolution supported by the peer end device, whether the peer end device supports the HDCP protocol, and an HDCP protocol version supported when the HDCP protocol is supported when the apparatus for controlling video output is started or insertion or removal occurs on the HDMI, the video driving module is further configured to set an initial output resolution of the video display controller to the resolution supported by the peer end device, and set the HDCP encryption status of the HDMI according to whether the peer end device supports the HDCP protocol, and the HDCP protocol version supported when the HDCP protocol is supported.

With reference to the first implementation of the third aspect, in second implementation of the third aspect, the video driving module is further configured to configure the output resolution of the video display controller according to the HDCP requirement of the video and the HDCP encryption status configured in the HDMI after the decryption module obtains the HDCP requirement of the video.

With reference to the third aspect, in a third implementation of the third aspect, the HDMI is connected to an HDMI of the peer end device, and the HDMI is configured to send, to the HDMI of the peer end device, video data on which HDCP encryption has been performed.

It can be learned from the foregoing that in the apparatus for controlling video output provided in the embodiments of the present disclosure, the security controller located in the TEE is added to hardware. After obtaining the HDCP requirement of the video, the decryption module directly and proactively allocates the HDCP requirement of the video to the security controller. The security controller is implemented by a digital logic circuit, and the security controller may detect in real time whether the output resolution of the video display controller and the HDCP encryption status of the HDMI satisfy the HDCP requirement of the video, and when the HDCP requirement of the video is not satisfied, it indicates that the video driving module located in an REE is attacked. Consequently, the output resolution of the video display controller or the HDCP encryption status of the HDMI of a set top box is tampered with. In this case, the video that is output using the HDMI of the set top box is insecure such that the security controller sends the instruction to the video display controller, to instruct the video display controller to stop the output of the video. Therefore, security of the video output is ensured.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 2:
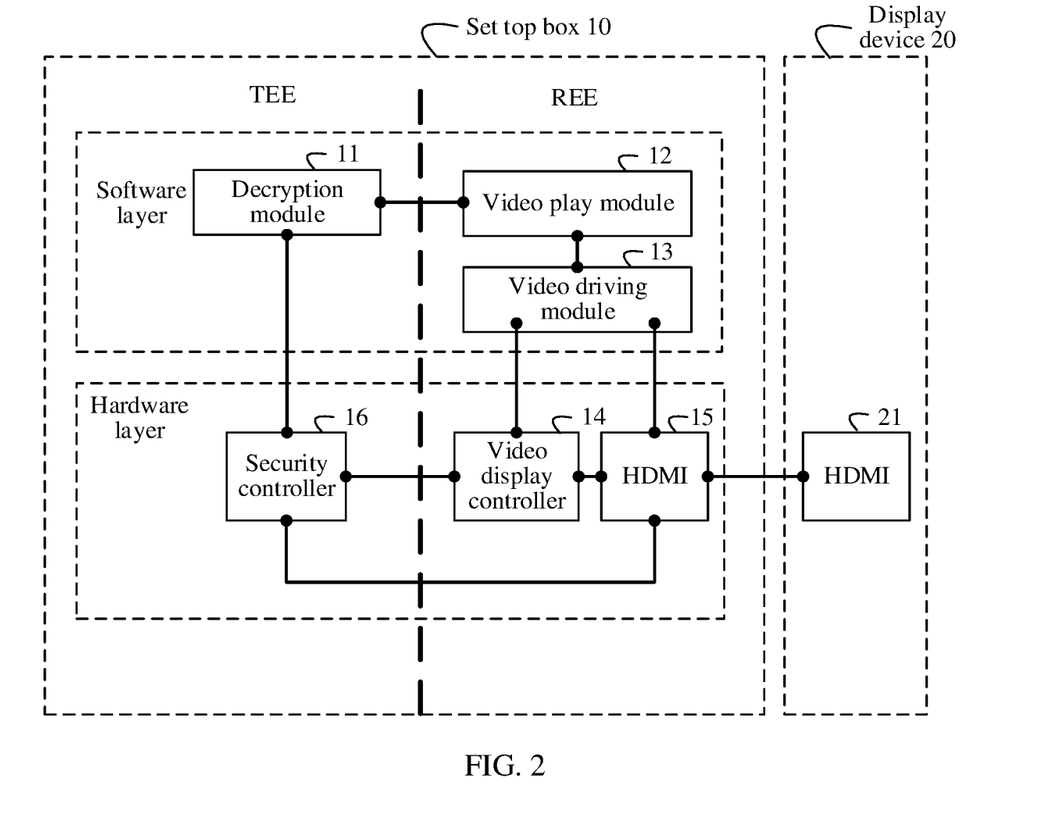
FIG. 2 is an architectural diagram of implementing video output in a system formed by a set top box and a display device according to an embodiment of the present disclosure.

FIG. 2 is an architectural diagram of implementing video output in a system formed by a set top box 10 and a display device 20 according to an embodiment of the present disclosure. In the set top box 10, a decryption module 11 at a software layer and a security controller 16 at a hardware layer are located in a TEE. A video play module 12 and a video driving module 13 at the software layer are located in an REE. A video display controller 14 and an HDMI 15 at the hardware layer are located in the REE. In the display device 20, the display device 20 includes an HDMI 21.

It should be emphasized that a difference between the architectural diagram of FIG. 2 and an architectural diagram is provided in FIG. 1 is that the security controller 16 is added to the hardware layer in the TEE, and the security controller 16 is implemented by a digital logic circuit.

When the set top box 10 is started or insertion or removal occurs on either one of the HDMIs of the set top box 10 and the display device 20, the video driving module 13 queries EDID information of the display device 20 using the HDMI 15 of the set top box 10 to obtain a resolution supported by the display device 20, whether the HDCP protocol is supported, and an HDCP protocol version supported when the HDCP protocol is supported.

The video driving module 13 sets an initial output resolution of the video display controller 14. Further, the video driving module 13 sets the initial output resolution of the video display controller 14 to the resolution supported by the display device 20.

The video driving module 13 further sets an HDCP encryption status of the HDMI 15 of the set top box 10. Further, when the display device 20 does not support the HDCP protocol, the video driving module 13 sets the HDCP encryption status of the HDMI 15 to HDCP encryption disabled. When the display device 20 supports the HDCP protocol, the video driving module 13 performs HDCP handshake negotiation according to the obtained HDCP protocol version supported by the display device 20 and the HDMI 21 of the display device 20. When the negotiation succeeds, the HDCP encryption status of the HDMI 15 is configured to HDCP protocol version encryption enabled. When the negotiation fails, the HDCP encryption status of the HDMI 15 is configured to HDCP encryption disabled.

For example, if HDCP2.2 negotiation succeeds, the HDCP encryption status of the HDMI 15 is configured to HDCP2.2 encryption enabled. If HDCP1.4 negotiation succeeds, the HDCP encryption status of the HDMI 15 is configured to HDCP1.4 encryption enabled. If HDCP2.2 negotiation and HDCP1.4 negotiation fail, the HDCP encryption status of the HDMI 15 is configured to HDCP encryption disabled.

When a user requests to play a video, the video play module 12 receives a play request of the user and stores the obtained video and license information of playing the video into a memory, and then triggers the decryption module 11 in the TEE to decrypt the license information of the video to obtain an HDCP requirement of the video. The HDCP requirement includes detecting whether HDCP encryption is used during transmission of the video, and an HDCP protocol version used when the HDCP encryption is used.

After the decryption module 11 obtains the HDCP requirement of the video, the video driving module 13 sets an output resolution of the video display controller 14 according to the HDCP requirement of the video and the HDCP encryption status configured in the HDMI 15 of the set top box.

After obtaining the HDCP requirement of the video, the decryption module 11 directly and proactively allocates the HDCP requirement of the video to the security controller 16. Further, the decryption module 11 sends a configuration request to the security controller 16. The configuration request includes the HDCP requirement of the video. The security controller 16 completes configuration on the HDCP requirement of the video according to the received configuration request.

After the HDCP requirement is configured, the security controller 16 detects in real time whether the output resolution of the video display controller 14 and the HDCP encryption status of the HDMI 15 satisfy the HDCP requirement allocated to the security controller 16.

When the output resolution of the video display controller 14 and the HDCP encryption status of the HDMI 15 both satisfy the HDCP requirement allocated to the security controller 16, the security controller 16 does not send an instruction to the video display controller 14 to control output of the video. That is, the security controller 16 does not perform any operation. The video display controller 14 continues to control the output of the video.

Otherwise, when the output resolution of the video display controller 14 or the encryption status of the HDMI 15 does not satisfy the HDCP requirement allocated to the security controller 16, the security controller 16 sends an instruction to the video display controller 14, to instruct the video display controller 14 to stop the output of the video.

For example, there may be the following three HDCP requirements for an HDCP2.2 protection system.

A. The HDCP2.2 version needs to be used;

B. The HDCP2.2 version may be used or the resolution is reduced to FHD to use the HDCP1.4 version; and C. The HDCP encryption does not need to be performed.

For each of the foregoing HDCP requirements, the following table provides, by way of example, correspondences in which whether the output resolution and the HDCP encryption status satisfy the HDCP requirement, and the security controller 16 may provide detection results according to the correspondences provided in the following table.

| HDCP requirement | Output resolution | HDCP encryption status | Detection result |
| --- | --- | --- | --- |
| A | Any resolution | HDCP2.2 encryption enabled | No operation is performed |
| B | UHD resolution | HDCP2.2 encryption enabled | No operation is performed |
| B | UHD resolution | HDCP1.4 encryption enabled | Send an instruction |
| B | FHD resolution | HDCP1.4 encryption enabled | No operation is performed |
| B | Any resolution | HDCP encryption disabled | Send an instruction |
| C | Any resolution | HDCP encryption disabled | No operation is performed |

The HDMI 15 is connected to the HDMI 21 of the display device 20, and is configured to send, to the HDMI 21 of the display device 20, video data on which the HDCP encryption has been performed such that the display device 20 displays the video data. Obviously, the HDIM interface 15 may alternatively send, to the HDMI 21 of the display device 20, video data on which the HDCP encryption is not performed.

In the foregoing embodiment, the security controller 16 located in the TEE is added to hardware of the set top box. After obtaining the HDCP requirement of the video, the decryption module 11 directly and proactively allocates the HDCP requirement of the video to the security controller 16. The security controller 16 is implemented by a digital logic circuit, and the security controller 16 may detect in real time whether the output resolution of the video display controller 14 and the HDCP encryption status of the HDMI satisfy the HDCP requirement of the video, and when the HDCP requirement of the video is not satisfied, it indicates that the video driving module 13 located in the REE is attacked. Consequently, the output resolution of the video display controller 14 or the HDCP encryption status of the HDMI of the set top box is tampered with. In this case, the video that is output using the HDMI of the set top box is insecure such that the security controller 16 sends the instruction to the video display controller 14 to instruct the video display controller 14 to stop the output of the video. Therefore, security of the video output is ensured.

Further, if the output resolution of the video display controller 14 and the HDCP encryption status of the HDMI both satisfy the HDCP requirement, it indicates that the video driving module 13 on a side of the REE is not attacked, and the output resolution of the video display controller 14 and the HDCP encryption status of the HDMI 15 of the set top box 10 are not tampered with. In this case, the video that is output using the HDMI 15 of the set top box 10 is secure.

In addition, it should be noted that because the security controller 16 at the hardware layer is implemented by the digital logic circuit, and the security controller 16 can monitor the video display controller 14 and the HDMI in real time, on the side of the REE, no timeslot can be used for attacking the video driving module 13, and the output resolution of the video display controller 14 and the HDCP encryption status of the HDMI 15 of the set top box 10 are not tampered with. Therefore, security of the video output is effectively ensured.

Figure 3:
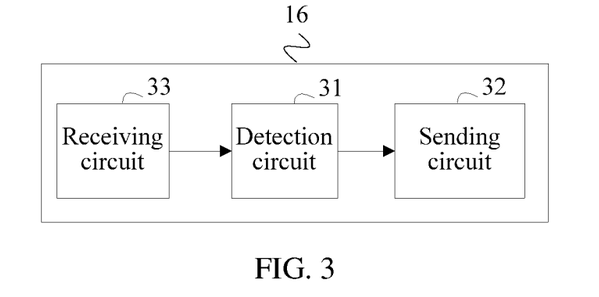
FIG. 3 is a schematic structural diagram of a security controller according to an embodiment of the present disclosure.

FIG. 3 is a structural diagram of a security controller 16 according to an embodiment of the present disclosure. Further, the security controller 16 includes a detection circuit 31 and a sending circuit 32.

The detection circuit 31 is configured to detect in real time whether an output resolution configured in a video display controller and an HDCP encryption status configured in an HDMI satisfy an HDCP requirement of a video.

The sending circuit 32 is configured to send an instruction to the video display controller to instruct the video display controller to stop output of the video when the detection circuit 31 determines that the configured output resolution or the configured HDCP encryption status does not satisfy the HDCP requirement of the video.

In another embodiment of the present disclosure, the security controller 16 further includes a receiving circuit 33.

The receiving circuit 33 is configured to receive a configuration request sent by a decryption module located at a software layer in a TEE. The configuration request includes the HDCP requirement of the video.

The HDCP requirement of the video is obtained by the decryption module located at the software layer in the TEE by decrypting license information of the video.

Figure 4:
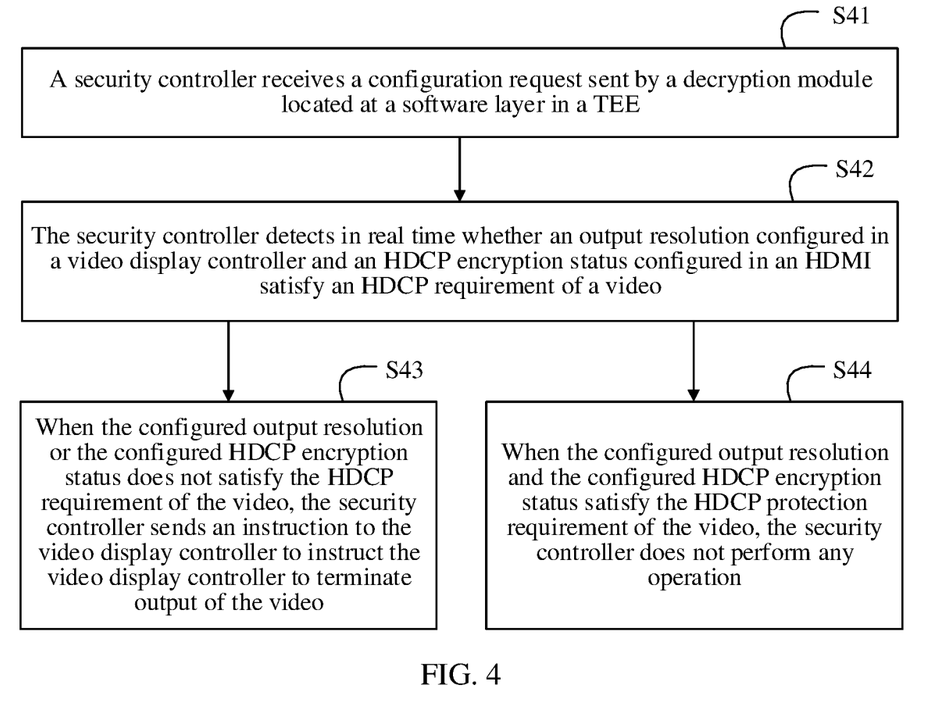
FIG. 4 is a method for controlling video output according to an embodiment of the present disclosure.

FIG. 4 is a method for controlling video output according to an embodiment of the present disclosure. The method for controlling video output is performed by a security controller in a display device. The security controller is located in a TEE of the display device and is implemented by a digital logic circuit.

Step S41: The security controller receives a configuration request sent by a decryption module located at a software layer in the TEE.

The configuration request includes an HDCP requirement of a video, and the HDCP requirement includes whether HDCP encryption is used during transmission of the video, and an HDCP protocol version used when the HDCP encryption is used.

Step S42: The security controller detects in real time whether an output resolution configured in a video display controller and an HDCP encryption status configured in an HDMI satisfy the HDCP requirement of the video.

The HDCP encryption status is HDCP protocol version encryption enabled or HDCP encryption disabled.

Step S43: When the configured output resolution or the configured HDCP encryption status does not satisfy the HDCP requirement of the video, the security controller sends an instruction to the video display controller, to instruct the video display controller to stop output of the video.

Step S44: When the configured output resolution and the configured HDCP encryption status satisfy the HDCP requirement of the video, the security controller does not perform any operation.

In the foregoing embodiment, because the security controller located at a hardware layer in the TEE is added, the security controller is implemented by the digital logic circuit, and the security controller may detect in real time whether the output resolution of the video display controller and the HDCP encryption status of the HDMI satisfy the HDCP requirement of the video, and when the HDCP requirement of the video is not satisfied, it indicates that a video driving module located in an REE is attacked. Consequently, the output resolution of the video display controller or the HDCP encryption status of the HDMI of a set top box is tampered with. In this case, the output video is insecure such that the security controller sends the instruction to the video display controller, to instruct the video display controller to stop the output of the video. Therefore, security of the video output is ensured.

It should be noted that the modules mentioned in the foregoing embodiments of the present disclosure all belong to software modules. For example, the decryption module, the video play module, and the video driving module all belong to software modules. A function of each software module is implemented by a processor by invoking a corresponding software program stored in a storage. The processor may be a central processing unit (CPU), and the storage may be a read-only memory (ROM).

In the several embodiments provided in the present application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for controlling video output, comprising:
receiving, by a security controller, a configuration request from a software layer in a trusted execution environment (TEE), wherein the configuration request comprises a high-bandwidth digital content protection (HDCP) requirement of a video;
detecting in real time, by the security controller, whether an output resolution configured in a video display controller and an HDCP encryption status configured in a high definition multimedia interface (HDMI) satisfy the HDCP requirement of the video, wherein the security controller is located at a hardware layer in the TEE; and
sending, by the security controller, an instruction to the video display controller instructing the video display controller to stop outputting the video when the configured output resolution or the configured HDCP encryption status does not satisfy the HDCP requirement of the video.

2. The method of claim 1, further comprising skip performing, by the security controller, any operation when the configured output resolution and the configured HDCP encryption status satisfy the HDCP requirement of the video.

3. The method of claim 1, wherein detecting in real time, by the security controller, whether the output resolution configured in the video display controller and the HDCP encryption status configured in the HDMI satisfy the HDCP requirement comprises:
detecting whether HDCP encryption is used during transmission of the video; and
detecting whether an HDCP protocol version is used when the HDCP encryption is used.

4. The method of claim 1, wherein the HDCP encryption status comprises HDCP protocol version encryption enabled.

5. The method of claim 1, wherein the HDCP encryption status comprises HDCP encryption disabled.

6. A control circuit located in a trusted execution environment (TEE), comprising:
a receiving circuit configured to receive a configuration request comprising a high-bandwidth digital content protection (HDCP) requirement of a video from a decryption circuit located at a software layer in the TEE;
a detection circuit coupled to the receiving circuit and configured to detect in real time whether an output resolution configured in a video display controller and an HDCP encryption status configured in a high definition multimedia interface (HDMI) satisfy the HDCP requirement of the video; and
a transmit circuit coupled to the detection circuit and the receiving circuit, wherein the transmit circuit is configured to send an instruction to the video display controller instructing the video display controller to stop outputting the video when the detection circuit determines that the configured output resolution or the configured HDCP encryption status does not satisfy the HDCP requirement of the video.

7. An apparatus for controlling video output, comprising:
a software layer comprising:
a memory configured to store instructions; and
a processor coupled to the memory, wherein the instructions cause the processor to be configured to:
receive a request for playing a video;
trigger a decryption process to decrypt license information of the video;
obtain a high-bandwidth digital content protection (HDCP) requirement of the video from the decrypted license information of the video; and
send a configuration request comprising the HDCP requirement of the video to a security controller; and
a hardware layer comprising:
a video display controller; and
a high definition multimedia interface (HDMI) coupled to the video display controller,
wherein the security controller is coupled to the video display controller and the HDMI and is configured to:
receive the configuration request from the processor;
detect in real time whether an output resolution configured in the video display controller and an HDCP encryption status configured in the HDMI satisfy the HDCP requirement of the video comprised in the configuration request; and
send an instruction to the video display controller when the configured output resolution or the configured HDCP encryption status does not satisfy the HDCP requirement of the video, and
wherein the video display controller is configured to:
receive the instruction from the security controller; and
stop outputting the video.

8. The apparatus of claim 7, wherein the instructions further cause the processor to be configured to:
query extended display identification data (EDID) information of a peer end device using the HDMI to obtain a resolution supported by the peer end device, whether the peer end device supports an HDCP protocol, and an HDCP protocol version supported when the HDCP protocol is supported when the apparatus is started or insertion or removal occurs on the HDMI;

set an initial output resolution of the video display controller to the resolution supported by the peer end device; and set the HDCP encryption status of the HDMI according to whether the peer end device supports the HDCP protocol, wherein the HDCP protocol version supported when the HDCP protocol is supported.

9. The apparatus of claim 8, wherein the instructions further cause the processor to be configured to configure the output resolution of the video display controller according to the HDCP requirement of the video and the HDCP encryption status configured in the HDMI after obtaining the HDCP requirement of the video.

* * * * *